United States Patent [19]
Joel et al.

[11] Patent Number: 5,514,214
[45] Date of Patent: May 7, 1996

[54] EYEGLASS LENS AND MOLD SPIN COATER

[75] Inventors: Larry H. Joel; Omar M. Buazza, both of Louisville, Ky.

[73] Assignee: Q2100, Inc., Louisville, Ky.

[21] Appl. No.: 123,886

[22] Filed: Sep. 20, 1993

[51] Int. Cl.$^6$ ........................................................ B05C 5/00
[52] U.S. Cl. ........................ 118/52; 118/56; 118/58; 118/64; 118/66; 118/300; 118/320; 118/501; 118/620; 118/642; 118/686; 118/712; 425/174.4; 425/808
[58] Field of Search ........................ 118/52, 56, 58, 118/64, 66, 300, 320, 500, 501, 620, 642, 686, 712; 425/174.4, 808; 427/553, 133, 164

[56] References Cited

U.S. PATENT DOCUMENTS

| | | |
|---|---|---|
| 2,370,565 | 2/1945 | Muskat et al. . |
| 2,370,567 | 2/1945 | Muskat et al. . |
| 2,379,218 | 6/1945 | Dial et al. . |
| 2,384,115 | 9/1945 | Muskat et al. . |
| 2,403,112 | 7/1946 | Muskat et al. . |

(List continued on next page.)

FOREIGN PATENT DOCUMENTS

| | | |
|---|---|---|
| 1244593 | 11/1988 | Canada . |
| 0226123 | 6/1987 | European Pat. Off. . |
| 0224123 | 6/1987 | European Pat. Off. . |
| 0299628 | 1/1989 | European Pat. Off. . |
| 0346996 | 12/1989 | European Pat. Off. . |

(List continued on next page.)

OTHER PUBLICATIONS

Tenser, Articles From *Vision Monday*, "25–Minute Lens-–Molding System Bows" (1991).
Tenser, 20/20, "25–Minute Lens–Molding System Debuts" (1991).
Leaflet from PPG Industries—CR–39 Monomer (1987).
Article from *Et Ultra* "The Peptide Connection" Winter-–Spring 1989.
Lipscomb et al., "Kinetics and Mechanism of the Benzoin Isobutyl Ether Photoinitiated Polymerization of Styrene" Lipscomb et al. *Journal of Polymer Science: Part A: Polymer Chemistry*, vol. 26, 529–540 (1988).
Submitted to the Faculty of the Graduate School of The University of Louisville in Partial Fulfillment of the Requirements for the Degree of Doctor of hilosophy entitled "UV–Photoinitiated Polymerization of Styrene and Diethylene Glycol Bis(Allyl Carbonate) by Aromatic Carbonyl Compounds" (Dec. 1987).
Tenser, Articles from *Vision Monday* dated Oct. 22, 1990 entitled "Vision Sciences Re–Casts Service Image".
Algrezza, Article from *Eyecare Business* dated Nov. 1990, pp. 28 and 29 entitled "Liquid Gold or Snake Oil?".
Roffey, "Photopolymerization of Surface Coatings" John Wiley & Jons, p. 163, 1982.

*Primary Examiner*—Laura Collins Edwards
*Attorney, Agent, or Firm*—Conley, Rose & Tayon

[57] ABSTRACT

Hard substrates such as ophthalmic lenses or molds are coated with a UV curable monomer which is polymerized to construct a scratch resistant coating on a surface of the lens. The present invention is directed to an apparatus for and method of applying the UV curable monomer to the surface of the ophthalmic lens or mold. Polymerization of the monomer occurs by radiation of UV light while the lens is encased in a curing chamber. The spin coater of the present invention has the following advantages: Excess monomer is collected in a dish away from UV exposure and is readily disposed of. The substrate is revolved at a high rate of speed during the application of the coating to achieve a uniform coating of monomer. Only the holder and substrate are moved to the curing chamber minimizing the items exposed to UV light. The UV light is electrodeless, it has a standby mode and operates cyclically during use so as to prolong its life and to allow a greater degree of control over extent of polymerization. Operation of the apparatus occurs automatically and can be performed by using pneumatic as well as electronic circuits.

40 Claims, 10 Drawing Sheets

U.S. PATENT DOCUMENTS

| | | |
|---|---|---|
| 2,403,113 | 7/1946 | Muskat et al. |
| 2,455,652 | 12/1948 | Bralley et al. |
| 2,479,522 | 8/1949 | Strain. |
| 2,524,862 | 10/1950 | White. |
| 2,525,664 | 10/1950 | Gadsby et al. |
| 2,529,866 | 11/1950 | Carlson. |
| 2,529,867 | 11/1950 | Carlson. |
| 2,542,386 | 2/1951 | Beattie. |
| 2,542,827 | 2/1951 | Minter. |
| 2,547,696 | 4/1951 | Foster. |
| 2,548,141 | 4/1951 | Bralley. |
| 2,568,658 | 9/1951 | Pope. |
| 2,587,437 | 2/1952 | Bralley et al. |
| 2,587,442 | 2/1952 | Carlson. |
| 3,038,210 | 6/1962 | Hungerford et al. |
| 3,210,297 | 10/1965 | Fischer et al. |
| 3,222,432 | 12/1965 | Grandperret. |
| 3,248,460 | 4/1966 | Naujokas. |
| 3,278,654 | 10/1966 | Grandperret. |
| 3,306,723 | 2/1967 | Forber. |
| 3,364,525 | 1/1968 | Davy et al. |
| 3,422,168 | 1/1969 | Bowser. |
| 3,423,488 | 1/1969 | Bowser. |
| 3,452,124 | 6/1969 | Knapp. |
| 3,469,254 | 2/1970 | Wichterle. |
| 3,497,577 | 2/1970 | Wichterle. |
| 3,503,942 | 3/1970 | Seiderman. |
| 3,551,235 | 12/1970 | Bassemir et al. |
| 3,557,249 | 1/1971 | Dannels et al. |
| 3,605,195 | 9/1971 | Campbell. |
| 3,660,545 | 5/1972 | Wichterle. |
| 3,720,827 | 3/1973 | Hemphill. |
| 3,745,042 | 7/1973 | Lim et al. |
| 3,779,995 | 12/1973 | Dannels et al. |
| 3,806,079 | 4/1974 | Beattie. |
| 3,808,178 | 4/1974 | Gaylord. |
| 3,872,042 | 3/1975 | Bond. |
| 3,915,609 | 10/1975 | Robinson. |
| 3,916,033 | 10/1975 | Merrill. |
| 3,938,775 | 2/1976 | Sarofeen. |
| 3,953,115 | 4/1976 | French et al. |
| 3,970,417 | 7/1976 | Page. |
| 3,971,872 | 7/1976 | LeBoeuf. |
| 3,991,234 | 11/1976 | Chang et al. |
| 4,022,855 | 5/1977 | Hamblen. |
| 4,031,163 | 6/1977 | Vollkommer et al. |
| 4,064,308 | 12/1977 | Laurin. |
| 4,069,168 | 1/1978 | Leatherman et al. |
| 4,071,424 | 1/1978 | Dart et al. |
| 4,091,050 | 5/1978 | McDonald. |
| 4,095,772 | 6/1978 | Weber. |
| 4,113,224 | 9/1978 | Clark et al. |
| 4,120,570 | 10/1978 | Gaylord. |
| 4,126,527 | 11/1978 | Kaufman. |
| 4,127,697 | 11/1978 | Laurin. |
| 4,132,518 | 1/1979 | Rips. |
| 4,138,538 | 2/1979 | Kaetsu et al. |
| 4,139,578 | 2/1979 | Baughman et al. |
| 4,139,692 | 2/1979 | Tanaka et al. |
| 4,144,262 | 3/1979 | Stevens. |
| 4,146,696 | 3/1979 | Bond et al. |
| 4,152,508 | 5/1979 | Ellis et al. |
| 4,164,099 | 8/1979 | Grant. |
| 4,166,088 | 8/1979 | Neefe. |
| 4,181,627 | 1/1980 | Weiher et al. |
| 4,191,717 | 3/1980 | Weber. |
| 4,191,804 | 3/1980 | Weber. |
| 4,197,266 | 4/1980 | Clark et al. |
| 4,202,226 | 5/1980 | Becker et al. |
| 4,205,154 | 5/1980 | Stevens. |
| 4,217,433 | 8/1980 | Dyball. |
| 4,227,950 | 10/1980 | Spycher. |
| 4,246,207 | 1/1981 | Spycher. |
| 4,251,474 | 2/1981 | Blandin. |
| 4,252,753 | 2/1981 | Rips. |
| 4,257,988 | 3/1981 | Matos et al. |
| 4,260,564 | 4/1981 | Baiocchi et al. |
| 4,298,005 | 11/1981 | Mutzhas. |
| 4,306,780 | 12/1981 | Tarumi et al. |
| 4,306,954 | 12/1981 | Wendling et al. |
| 4,308,400 | 12/1981 | Felder et al. |
| 4,310,642 | 1/1982 | Margotte et al. |
| 4,311,762 | 1/1982 | Spycher et al. |
| 4,313,355 | 2/1982 | Becker et al. |
| 4,342,863 | 8/1982 | Hohokabe et al. |
| 4,345,546 | 8/1982 | Weber. |
| 4,346,197 | 8/1982 | Crano et al. |
| 4,347,302 | 8/1982 | Gotman. |
| 4,360,637 | 11/1982 | Schwarz. |
| 4,369,298 | 1/1983 | Kida et al. |
| 4,376,800 | 3/1983 | Lu et al. |
| 4,378,250 | 3/1983 | Treadway et al. |
| 4,382,902 | 5/1983 | Feurer. |
| 4,390,482 | 6/1983 | Feurer. |
| 4,408,016 | 10/1983 | Eads et al. |
| 4,416,837 | 11/1983 | Neefe. |
| 4,417,790 | 11/1983 | Dawson et al. |
| 4,432,832 | 2/1984 | Fantone. |
| 4,440,669 | 4/1984 | Smid et al. |
| 4,440,909 | 4/1984 | Crano et al. |
| 4,447,468 | 5/1984 | Keable. |
| 4,455,322 | 6/1984 | Weber. |
| 4,476,162 | 10/1984 | Ireland. |
| 4,487,904 | 12/1984 | Fukuda et al. |
| 4,490,495 | 12/1984 | Weber. |
| 4,497,754 | 2/1985 | Padoan. |
| 4,506,951 | 3/1985 | Yamada. |
| 4,512,340 | 4/1985 | Buck. |
| 4,522,768 | 6/1985 | Roscrow et al. |
| 4,528,351 | 7/1985 | Tarumi et al. |
| 4,534,915 | 8/1985 | Neefe. |
| 4,536,267 | 8/1985 | Ito et al. |
| 4,537,732 | 8/1985 | Ueda et al. |
| 4,542,201 | 9/1985 | Kanemura et al. |
| 4,543,146 | 9/1985 | Petcen. |
| 4,544,572 | 10/1985 | Sandvig et al. |
| 4,547,397 | 10/1985 | Burzynski et al. |
| 4,551,361 | 11/1985 | Burzynski et al. |
| 4,556,605 | 12/1985 | Mogami et al. |
| 4,561,951 | 12/1985 | Neckers. |
| 4,589,231 | 5/1986 | Roberts. |
| 4,590,248 | 5/1986 | Moriya et al. |
| 4,594,288 | 6/1986 | Dobigny et al. |
| 4,607,087 | 8/1986 | Moriya et al. |
| 4,609,267 | 9/1986 | Deguchi et al. |
| 4,613,656 | 9/1986 | Tang. |
| 4,620,954 | 11/1986 | Singer et al. |
| 4,622,376 | 11/1986 | Misura et al. |
| 4,623,708 | 11/1986 | Ezrielev et al. |
| 4,632,773 | 12/1986 | Neefe. |
| 4,636,212 | 1/1987 | Posin et al. |
| 4,637,698 | 1/1987 | Kawk et al. |
| 4,640,805 | 2/1987 | Neefe. |
| 4,643,537 | 2/1987 | Vance. |
| 4,655,005 | 4/1987 | Roberts. |
| 4,663,183 | 5/1987 | Ovshinsky et al. |
| 4,666,976 | 5/1987 | Misura. |
| 4,668,751 | 5/1987 | Nakamoto et al. |
| 4,686,266 | 8/1987 | Tang. |
| 4,693,446 | 9/1987 | Orlosky. |
| 4,695,399 | 9/1987 | Neefe. |
| 4,701,288 | 10/1987 | Cook et al. |

| | | | | | | |
|---|---|---|---|---|---|---|
| 4,702,574 | 10/1987 | Bawa . | | 4,874,828 | 10/1989 | Lukacs . |
| 4,721,377 | 1/1988 | Fukuda et al. . | | 4,879,318 | 11/1989 | Lipscomb et al. . |
| 4,728,469 | 3/1988 | Danner et al. . | | 4,880,667 | 11/1989 | Welch . |
| 4,732,715 | 3/1988 | Bawa et al. . | | 4,892,403 | 1/1990 | Merle . |
| 4,737,447 | 4/1988 | Suzuki et al. . | | 4,895,102 | 1/1990 | Kachel . |
| 4,742,133 | 5/1988 | Tang et al. . | | 4,902,725 | 2/1990 | Moore . |
| 4,745,168 | 5/1988 | Nakamoto et al. . | | 4,904,525 | 2/1990 | Taniguchi et al. . |
| 4,746,716 | 5/1988 | Oates . | | 4,911,538 | 3/1990 | Robb . |
| 4,756,972 | 7/1988 | Kloosterboer et al. . | | 4,912,185 | 3/1990 | Toh . |
| 4,757,129 | 7/1988 | Oates . | | 4,919,850 | 4/1990 | Blum et al. . |
| 4,758,448 | 7/1988 | Sandvig et al. . | | 4,929,707 | 5/1990 | Nagata et al. . |
| 4,774,035 | 9/1988 | Carmelite et al. . | | 4,931,220 | 6/1990 | Haynes et al. . |
| 4,774,282 | 9/1988 | Qureshi . | | 4,931,523 | 6/1990 | Watanabe et al. . |
| 4,775,733 | 10/1988 | Kanemura et al. . | | 4,936,995 | 6/1990 | Kwiatkowski . |
| 4,783,361 | 11/1988 | Ovshinsky et al. . | | 4,946,923 | 8/1990 | Nagata et al. . |
| 4,789,318 | 12/1988 | Ehrit . | | 4,948,447 | 8/1990 | Clarke et al. . |
| 4,791,185 | 12/1988 | Kanemura et al. . | | 4,950,041 | 8/1990 | Robb . |
| 4,792,224 | 12/1988 | Kwiatkowski et al. . | | 4,955,804 | 9/1990 | Martell et al. . |
| 4,795,461 | 1/1989 | Lindqvist et al. . | | 4,959,429 | 9/1990 | Misura et al. . |
| 4,800,123 | 1/1989 | Boeckeler . | | 4,979,888 | 12/1990 | Bauer et al. .......................... 425/174.4 |
| 4,801,667 | 1/1989 | Brand . | | 4,988,274 | 1/1991 | Kenmochi . |
| 4,803,254 | 2/1989 | Dunks et al. . | | 5,164,228 | 11/1992 | Peralta et al. . |
| 4,808,652 | 2/1989 | Gardner . | | 5,246,499 | 9/1993 | Peralta et al. ........................... 118/704 |
| 4,812,032 | 3/1989 | Fukuda et al. . | | 5,248,529 | 9/1993 | Hammond et al. ...................... 118/320 |
| 4,812,598 | 3/1989 | Chen . | | | | |
| 4,816,584 | 3/1989 | Kawk et al. . | | | FOREIGN PATENT DOCUMENTS | |
| 4,820,747 | 4/1989 | Chen . | | 2551223 | 3/1985 | France . |
| 4,822,864 | 4/1989 | Chen . | | 55-132221 | 10/1980 | Japan . |
| 4,829,136 | 5/1989 | Oates . | | 59-86603 | 5/1984 | Japan . |
| 4,836,960 | 6/1989 | Spector et al. . | | 39-17442 | 8/1984 | Japan . |
| 4,837,289 | 6/1989 | Mueller et al. . | | 60-245607 | 12/1985 | Japan . |
| 4,839,109 | 6/1989 | Kaetsu et al. . | | 62-288030 | 12/1987 | Japan . |
| 4,842,782 | 6/1989 | Portney et al. . | | 3-184001 | 8/1991 | Japan . |
| 4,846,913 | 7/1989 | Frieder et al. . | | 2082107 | 3/1982 | United Kingdom . |
| 4,861,823 | 8/1989 | Qureshi . | | 2155940 | 10/1985 | United Kingdom . |
| 4,871,821 | 10/1989 | Stenzenberger et al. . | | 8911966 | 12/1989 | WIPO . |
| 4,873,029 | 10/1989 | Blum . | | 9013413 | 11/1990 | WIPO . |
| 4,874,561 | 10/1989 | Spector . | | | | |

EYEGLASS LENS AND MOLD SPIN COATER

BACKGROUND OF THE INVENTION

1. Field of the Invention

The present invention is directed to a method and apparatus for applying a coating to an eyeglass lens or mold. In particular, the method and apparatus of the invention may be adapted to apply a ultraviolet light curable scratch resistant coating to an eyeglass lens or mold.

2. Brief Description of the Prior Art

The application of a scratch resistant coating onto the surface of an optical element has been known for some time. A wide variety of techniques and materials for applying the abrasion resistant coating have been developed over the years. Common coating techniques involve applying a composition (e.g., "a monomer solution") onto the surface of an optical element by spin, dip, spray or flow coating.

Recently, developments in this field have involved in-mold coating techniques, in which a liquid coating is applied to a surface of a mold and then transferred to the lens as the lens and mold having the coating thereon are being cured.

U.S. Pat. No. 4,895,102 issued to Kachel et al. discloses a spin coater having a drawer mounted within a housing, slidable between front and rear chambers thereof. The rear chamber is where the coated lens is exposed to a mercury vapor actinic light.

In U.S. Pat. No. 4,447,468 issued May 8, 1984 to J. B. Keable, spindled photographic film discs are coated with an ultraviolet light curable protective coating apparatus which receives a developer spindle carrying a plurality of film discs at a receiving station.

U.S. Pat. No. 5,164,228 issued Nov. 17, 1992 to Peralta et al. reports a spin coating process which coats plastic ophthalmic lenses with a scratch-resistant coating.

Generally, spin coater apparatus utilize either heat, mercury vapor lamps, or ultraviolet light emitting lamps having electrodes as curing light sources. These lamps have relatively short lifetimes, partly because of their need to be constantly run, and partly because of their considerable warm-up period. Therefore, there is a need to develop a spin coater having a light emitting source that uses less power, has a longer life, and provides more efficient control over the degree of polymerization.

A disadvantage of prior art spin coaters is the tendency of excess monomer solution to contact other components of a coating application chamber or the wrong surface of the lens or mold. For instance, if the convex side of a lens or mold was being coated, sometimes the monomer solution would leak or be spilled to the concave side of the lens or mold. In such a case, the monomer solution on the concave side of the lens or mold would tend to cure with the other monomer solution, and thus leave a portion of the concave surface with a hardened burr or mark on it. This burr or mark was unsightly and often a problem since it was not as tintable as the areas on the concave surface that had not been accidentally coated with monomer solution.

Another disadvantage of some prior art apparatus for lens or mold coating is that environmental dust or hardened airborne monomer particles tended to contaminate the coatings, lenses, or molds, thus causing imperfections in the surfaces of the resulting coated lenses or molds.

SUMMARY OF THE INVENTION

The present invention is directed to an apparatus for applying a protective, ultraviolet curable liquid coating to a surface of a hard substrate such as an ophthalmic lens or mold in a convenient, efficient manner, with relatively little operator intervention, and to a method for applying the protective ultraviolet curable liquid coating.

The apparatus of the invention may include a coating application chamber, a holder, a dispenser, an elevation component, and a curing chamber. The holder may be adapted to secure a substrate such as a lens or mold while it revolves. The dispenser is adapted to apply a predetermined amount of curable liquid coating material to the substrate surface while it is in the coating application chamber. The elevation component may elevate and lower the holder and substrate to the curing chamber from the coating application chamber, and vice versa. The curing chamber may have a sidewall arrangement, a bottom wall having an opening for receiving the substrate, and a top wall on which an ultraviolet ("UV") light emitting apparatus is mounted. A covering is disposed at the curing chamber bottom wall opening. The covering tends to cause UV light to remain inside the curing chamber, and thus not leak into the coating application chamber. The UV light emitting source may be electrodeless and thus may not require warm-up prior to use. As such, this light tends to reduce or eliminate the possibility of polymerization of the coating in the coating application chamber. It also provides appropriate control over polymerization of the coating, and thereby enhances system efficiency.

The method of applying a protective ultraviolet curable coating to the surface of a hard substrate such as an ophthalmic lens or mold involves the positioning and stabilizing of the substrate in a holder. While in the holder, the substrate is revolved or spun about a vertical axis at a high number of revolutions per minute, preferably ranging from 600–1500 rpm. While the substrate is spinning, an ultraviolet curable liquid solution (which may include a solution of monomer and a curing agent) may be applied to its surface. The substrate is revolved at the relatively high number of rpm for a short period for the purpose of causing the liquid solution to radially disburse, driving off any excess coating material and forming a substantially evenly spread film on the surface of the substrate. In some embodiments the revolving substrate may be slowed so that enough centrifugal force can be maintained to keep the film uniform. In other embodiments the substrate spinning is halted by, e.g., simply switching off a motor that is powering the spinning action. In any case, after the film is uniform, the substrate is elevated to a curing chamber, where the film is irradiated with ultraviolet light for a time sufficient to obtain the desired level of polymerization. The irradiation is preferably performed in a manner that causes the film on the substrate to polymerize but avoids polymerization of film on or liquid solution on any other part of the apparatus.

DETAILED DESCRIPTION OF THE PREFERRED EMBODIMENTS

Figure 1:
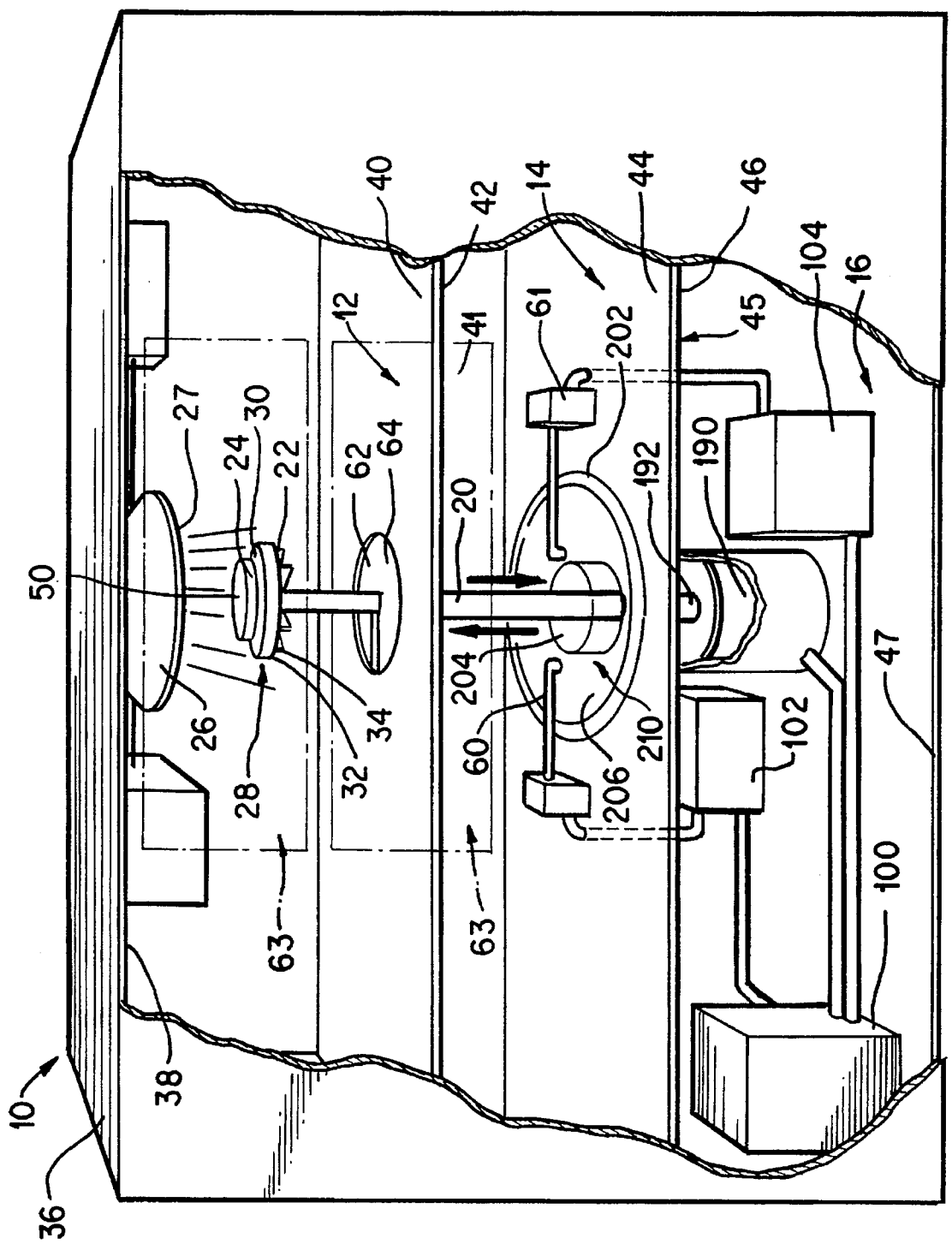
FIG. 1 is a perspective view of a spin coater apparatus having a cut away section showing the inter-working of its elements.

An apparatus for applying a protective coating to an eyeglass lens or mold is illustrated in FIG. 1. The apparatus is housed in a cabinet 10, where a portion of the cabinet 10 is broken away for the purpose of illustrating the various working parts of the apparatus.

The cabinet 10 which houses the apparatus may have three compartments, curing chamber 12, coating application chamber 14, and mounting base 16. The mounting base 16 in FIG. 1 is formed by an enclosed region having a top 45, bottom 47 and vertical sidewall arrangement. The vertical sidewall arrangement is the general vertical sidewall arrangement of the cabinet 10. The top wall 45 has a circular cavity 60 in which a spray application dish 210 is positioned to cover the circular cavity 60.

Figure 3:
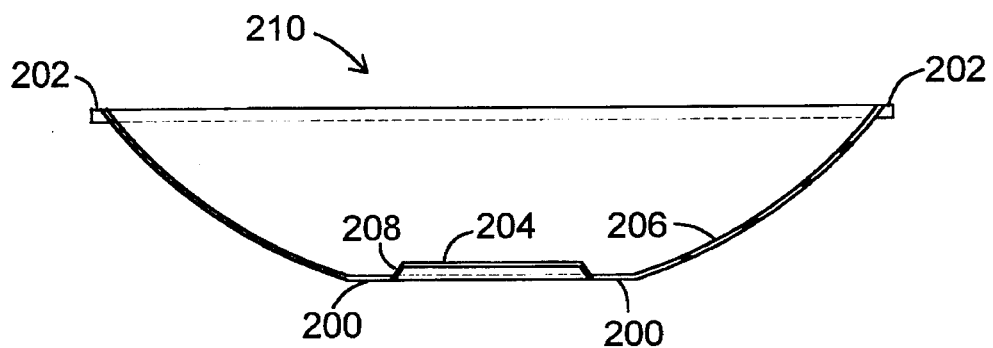
FIG. 3 is a cross section along the lines 3—3 of FIG. 4.
Figure 4:
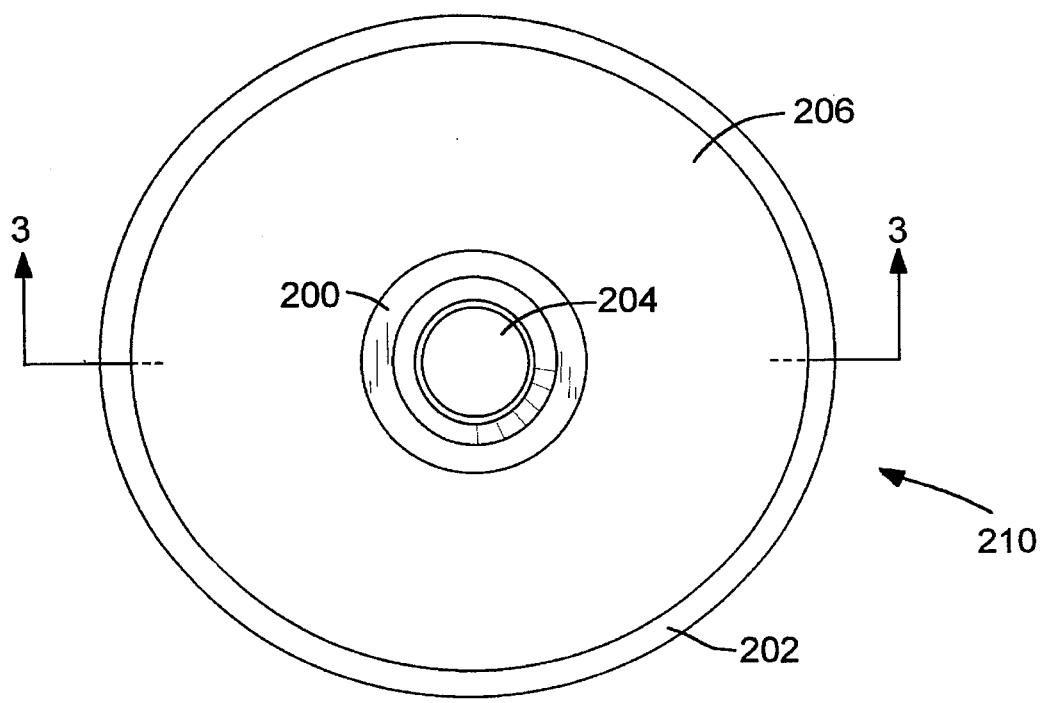
FIG. 4 is a top view of a spray application dish.

As shown in FIGS. 3 and 4, the spray application dish 210 may have a substantially flat bottom 200. The spray application dish 210 edges have been inclined to form a peripheral sidewall arrangement 206. The flat bottom 200 and the peripheral sidewall 206 form a continuous surface. The peripheral sidewall 206 gradually slopes upwardly and outwardly from the flat bottom 200 center to its edge that has been manipulated to form a periphery rim 202. The flat bottom 200 has a circular opening 204 that provides a position of rest for the holder 28 while the holder 28 is in the coating application chamber 14. The circular opening 204 has an edge that has been manipulated to form an inner peripheral sidewall arrangement 208 that slopes upwardly and inwardly.

As shown in FIG. 1, the spray application dish periphery rim 202 may engage with the cabinet mounting base 16, top wall first surface 44, where the top wall 45 has first 44 and second 46 surfaces. The dish periphery rim 202 circumference is shown to be larger than the circumference of the mounting base circular cavity 60, and thereby rests on the cabinet mounting base top wall 45 first surface 44, when the dish 210 is positioned to cover the circular cavity 60.

Figure 7:
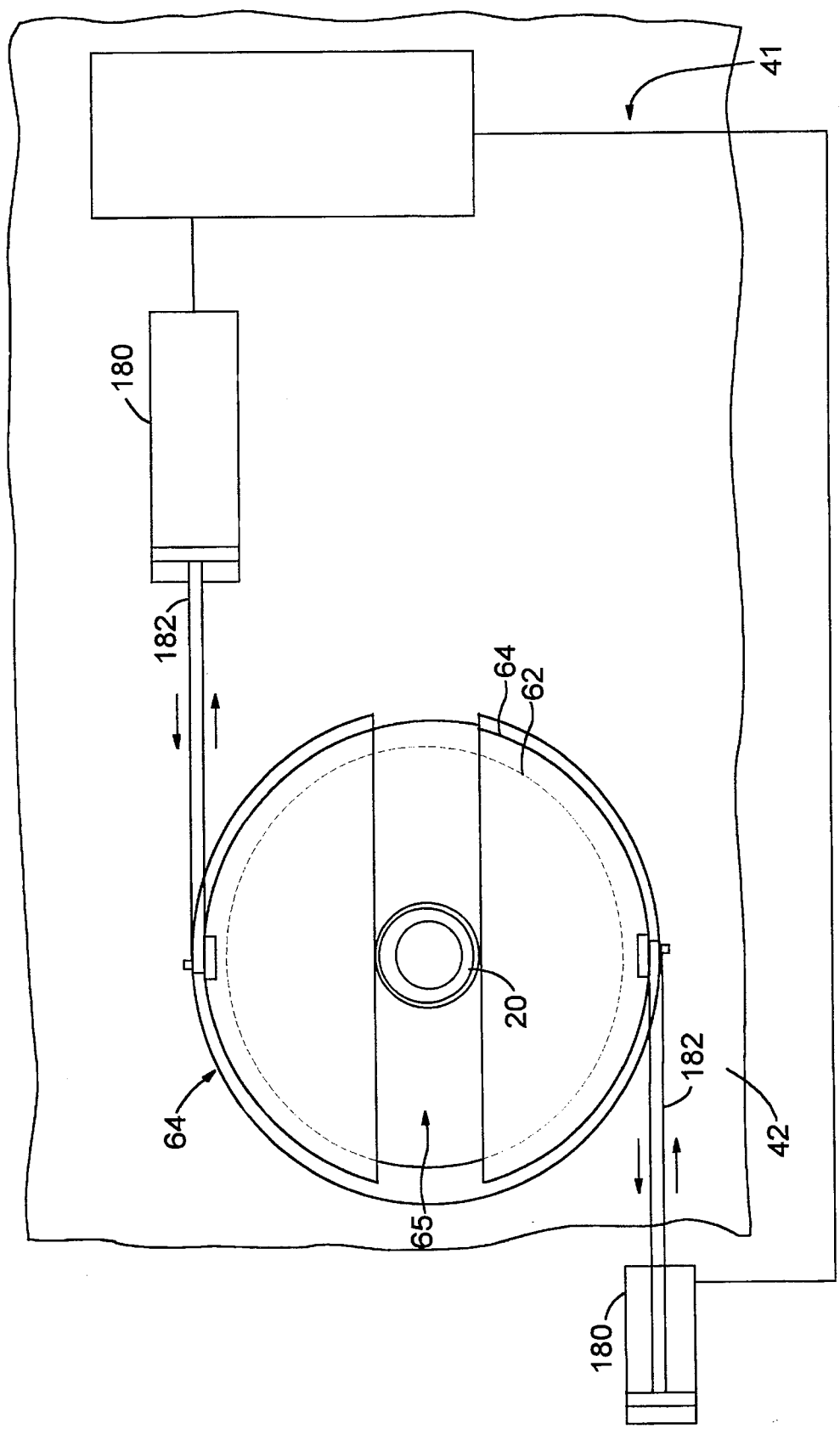
FIG. 7 is a bottom view of the curing chamber floor showing the bottom wall opening and its door.

The coating application chamber 14 is an enclosure that may have a top 41, bottom 45, and vertical sidewall arrangement, wherein the vertical sidewall arrangement is the general vertical sidewall arrangement of the cabinet 10. The top wall 41 may have first 40 and second 42 surfaces, where top wall 41 second surface 42 is the top wall of the coating application chamber, and top wall 41 first surface 40 is the floor of the curing chamber 12. The floor of the curing chamber includes the coverings 64, and the bottom wall 41 as shown in FIG. 7.

Figure 2:
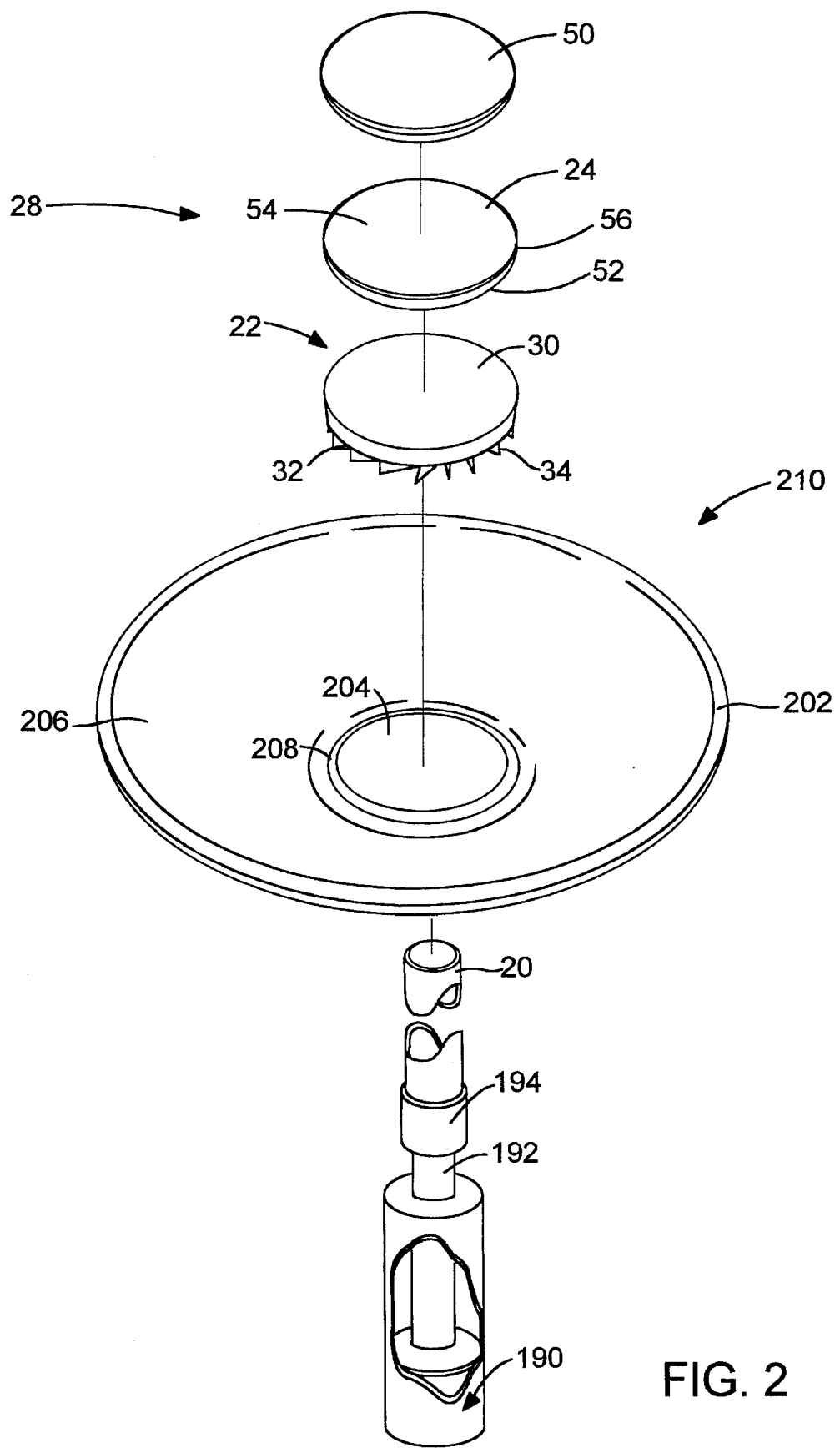
FIG. 2 is a perspective of a spray application dish and the elements of a holder having a substrate thereon.

In one embodiment, as shown in FIG. 2, the holder 28 is comprised of a disk 22 that has first 30 and second 32 surfaces and a silicone rubber sleeve 24. The silicone rubber sleeve 24 provides a way to stabilize the substrate 50, such as a lens, mold or the like, on the disk 22 of the holder 28. In other embodiments, the stabilization may be accomplished by clamp, suction or other stabilizing means, so long as the apparatus used does not degrade during the UV curing process and allows the substrate surface to be coated substantially evenly.

In other embodiments of the invention, multiple substrate elements may be substantially simultaneously positioned and stabilized in one apparatus.

As shown generally in FIG. 1, the holder 28 may be positioned inside the spray application dish 210 circular cavity 204. The holder 28 is positioned such that the holder disk first surface 30 remains above the spray application dish 210 inner periphery sidewall arrangement 208.

Positioning of the holder 28 may be important. Proper positioning allows excess coating material that is discharged from a spinning substrate to run into the spray application dish 210, not into the mounting base 16 where coating material may affect the working parts.

In alternate embodiments of the invention, the spray application dish 210 cavity 204 may be lined with a foam. This foam may act to catch stray droplets of coating material that may drip or be forced from the holder 28 or the substrate 50. The foam may thus prevent "splash-back" of coating material onto the lens or mold during spinning.

Figure 6:
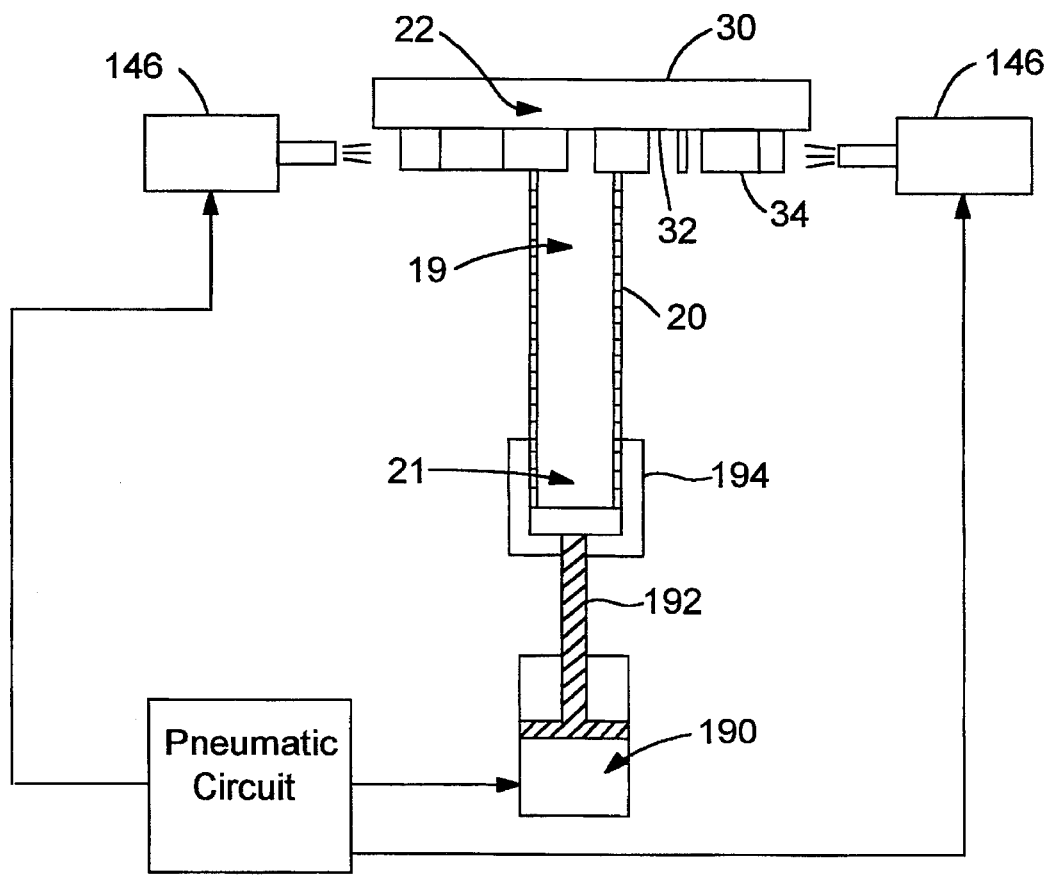
FIG. 6 is a cross section of a holder disk having a shaft attached thereto illustrating the means for elevation.

As shown in FIG. 6, the holder may be connected to a shaft 20 that has first 19 and second 21 ends. The first end 19 of the shaft 20 is connected to the center of the second surface 32 of the disk 22. A system having a rotator interacts with the shaft 20 first 19 or second 21 ends, allowing the disk 22 to rotate about an axis.

In one embodiment, the rotator may include a ball bearing system 70, and vanes 34 on the second surface 32 of the disk 22, that engage with air from air blowers 146. The ball bearing system 70 may comprise a cavity of the appropriate circular form, in the disk second surface 32 of FIG. 5, including ball bearings 72 for engagement with shaft 20. The shaft 20 may engage with and be part of the ball bearing system 70. As shown in FIG. 6, the rotator may have at least one air blower 146. The air blower 146 is positioned in the mounting base 16, and connected to the second surface 46 of the mounting base 16 top wall. The air blower 146 may be positioned to allow air to be blown onto the disk vanes, 34 causing the disk 22 to rotate freely about the center axis of the shaft 20, on the ball bearing system 70. The air pressure may be varied to give a range of revolutions per minute to the holder 28 and substrate 50.

As shown in FIG. 1, rotation of the holder 28 and substrate 50 preferably occurs while a UV curable solution is being applied to the substrate 50 by at least one solution dispensing device 61. The rotator of this embodiment may allow for the holder 28 and substrate 50 to rotate, without rotation of the shaft 20. This rotator is further described later.

Figure 11:
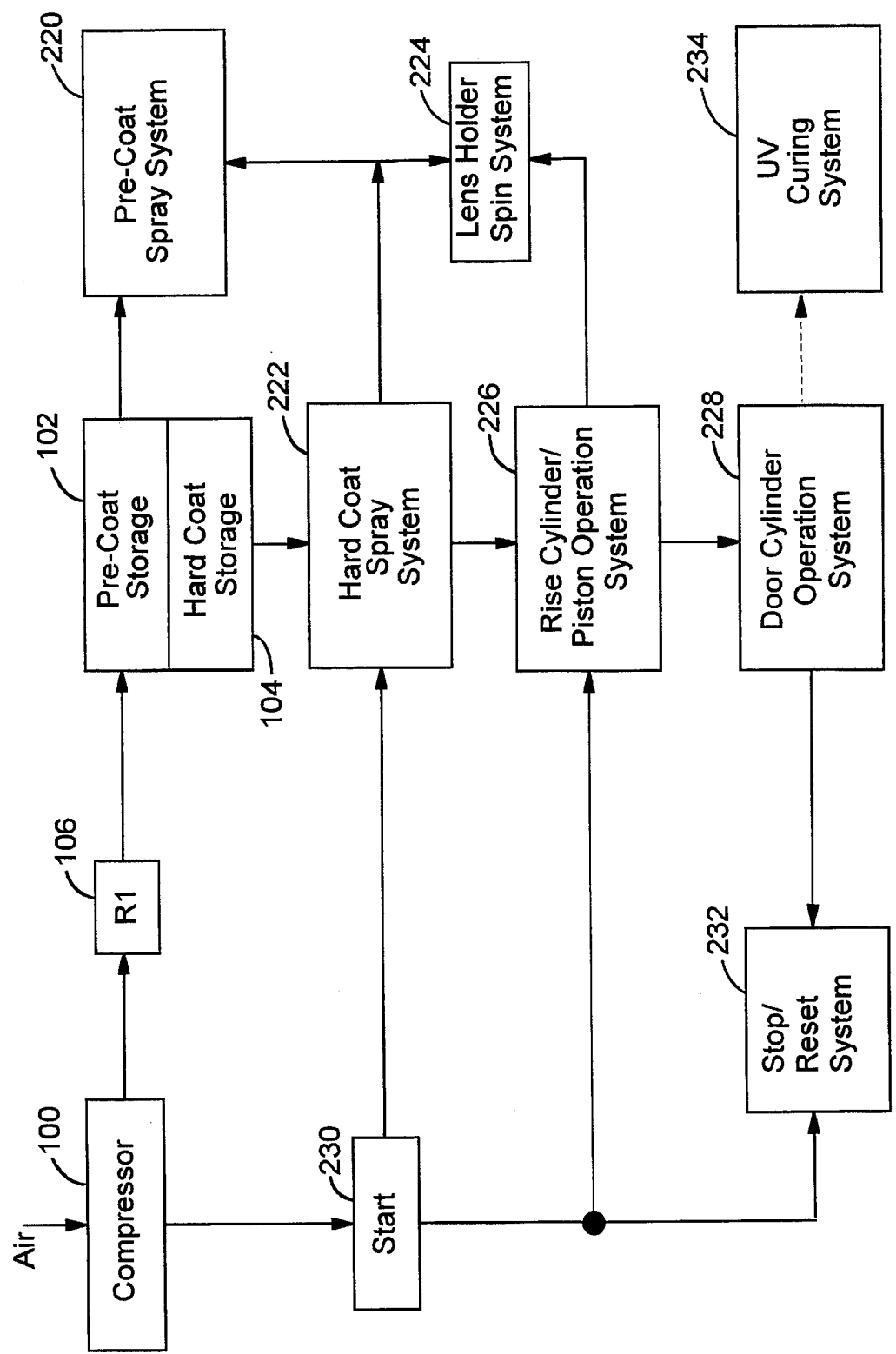
FIG. 11 is a block diagram of the essential functional circuit elements of the apparatus.

As shown in FIG. 6, the second end 21 of the shaft 20 may be connected to a base that has an elevator. In this embodiment, the elevator is comprised of a piston cylinder 190. The second end 21 of the shaft 20 is connected to the plunger axle 192 of the piston cylinder 190. The piston/cylinder 190 is controlled by the amount of air flowing in or out of the piston/cylinder 190. The amount of air flowing in or out of the piston/cylinder 190 is controlled by a pneumatic control circuit system 98 (further described later), as illustrated in FIG. 11.

In other embodiments basic components like those shown in FIG. 1 may be employed but such embodiments may primarily differ in the construction of the rotator and elevator elements. In such embodiments, the rotator may be performed by actual rotation of a shaft similar to shaft 20 of FIG. 1. The shaft first end is stationarily connected to a holder disk second surface. The shaft second end engages with a base having a ball bearing system that allows the shaft to rotate. Near the second end of the shaft are grooves which allow the shaft to interact with a band having raised slits. The raised slits on the band are spaced proportionate to the grooves near the second end of the shaft, so that when the band is positioned around the shaft, the raised slits fit easily into the grooves, thereby causing better collaboration between the two elements. The band also interacts with a motor having a crank with grooves identical to those towards the second end of the shaft, allowing for the same collaboration between the band and motor crank as that which occurs between the band and shaft. The motor, when powered, causes the crank shaft with the band fitted thereon to turn. The grooves of the crank shaft and the slits of the band interact, causing the band to move. Because the band is also positioned on the shaft, its movement causes its slits to interact with the grooves on the shaft, thereby causing the shaft to rotate. The shaft, being stationarily connected to the center of the holder disk second surface, causes the holder to revolve, thereby causing a substrate, similar to the substrate 50 of FIG. 1, positioned thereon to revolve. This system further has a elevator for shaft and holder elevation from a resting station to a curing chamber, where the curing chamber and resting station are similar to those of FIG. 1. The elevator may comprise the same piston cylinder 190 arrangement as shown in FIG. 6, having the ball bearing system attached to the end of piston cylinder plunger axle 192 and the second end of a shaft.

Referring again to FIG. 1, the curing chamber 12 is preferably formed by an enclosed region, having a sidewall arrangement and top 38 and bottom walls 41. The bottom wall 41 may have a circular opening 62, as shown in FIGS. 1 and 7, having its size adapted for receiving the holder 28 and substrate 50 thereon. Curing chamber bottom wall 41 circular opening 62 may further have one or more coverings 64 movable between open and closed positions, and adapted to remain closed during the non-curing stages, as shown in FIG. 7. The coverings 64 are preferably adapted to open after the liquid coating application to receive the holder 28, and to close after the holder 28 and substrate positioned thereon have been received, illustrated in FIG. 1.

A covering 64 may be formed of a flat piece of solid material having a shape and size that is substantially similar to (or larger than, in some instances) the shape and size of the curing chamber bottom wall opening 62. The covering 64 may have a slit 65 that passes through its center until it reaches the middle of the covering 64. The covering slit 65 is featured to allow for the shaft 20 that is inside the curing chamber 12 and protruding outside through the curing chamber bottom wall opening 62, as shown in FIG. 1.

As shown in FIG. 7, in a preferred embodiment the coverings 64 may include two or more separate coverings mounted one on top of the other, and with at least two slits 65 being located on opposite sides of at least two different coverings. In this embodiment less light is passed from the curing chamber 12 through curing chamber bottom wall opening 62 since the each slit 65 is covered by a part of each covering.

In other embodiments, the covering may take the form of an iris or a double doors having hinged connections. The iris may be formed by a number of thin blades slidably connected (e.g., connected like that of a camera iris). At one end of each blade is a pivot, while the other end is attached to a pin on a movable ring. When the ring is rotated by a projecting lever, the blades move across and close an aperture in a curing chamber bottom wall, similar to the bottom wall 62 in the curing chamber 12 as shown in FIG. 1. As shown in FIG. 7, the aperture 62 closure, is controlled by the projecting lever 182, and is adapted to accommodate the shaft 20.

Piston/cylinders 180 preferably control the opening and closing of the covering 64. The piston/cylinder axles are connected to a surface of the covering 64.

Figure 9:
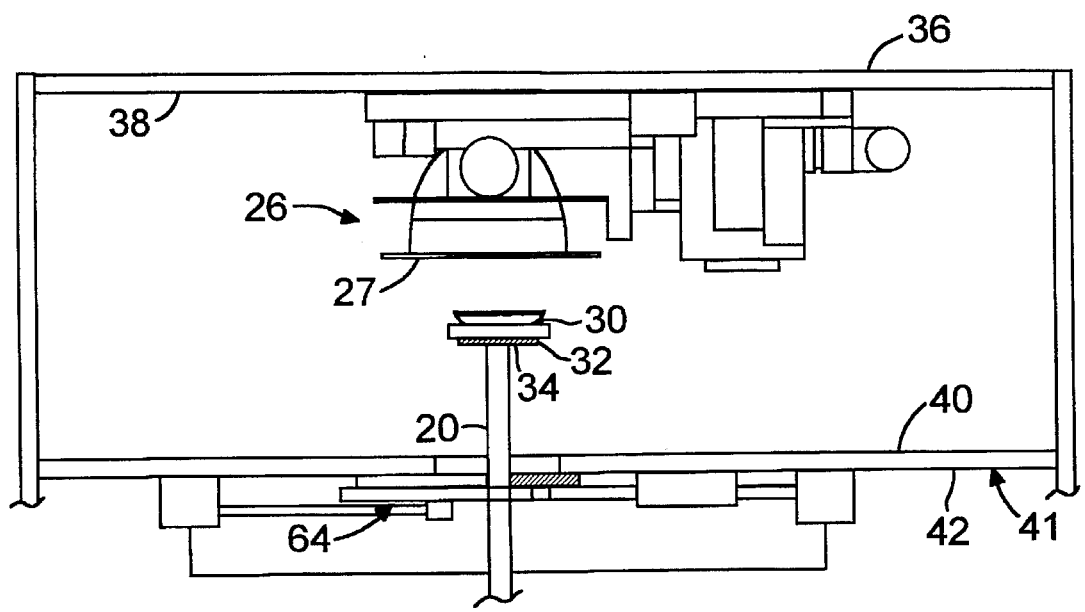
FIG. 9 is a cross section of the UV Lamp, illustrating its position with respect to the holder and substrate thereon.

As shown in FIG. 1, after the piston/cylinders 180 cause the covering 64 to close the curing chamber bottom wall opening 62, the UV light emitting apparatus (UV lamp) 26 that is stationarily attached to the top wall 38 of the housing cabinet 10 may be activated. Radiation of UV light onto the coated substrate 50 cures the coating composition through polymerization. The UV lamp 26, as can be seen in FIG. 9, is positioned such that the UV light emitting face 27 is approximately perpendicular with the curing chamber bottom wall 40, including the covering 64. UV light is radiated for a period of time sufficient to polymerize the coating material to the desired level of cure. In some embodiments this period of time is approximately 35–45 seconds. After the cycle is completed, the emission of UV light is interrupted.

Following the UV radiation cycle, the UV lamp 26 returns to standby mode, triggering the coverings 64 to open. After the coverings 64 completely open, the substrate 50 and holder 28 are lowered by the elevator to their resting position in the coating application chamber 14, thereby ending the cycle.

The curing chamber 12 and/or the coating application chamber 14 may further have an air blowing apparatus 63 allowing filtered air to be circulated throughout either of them.

Figure 8:
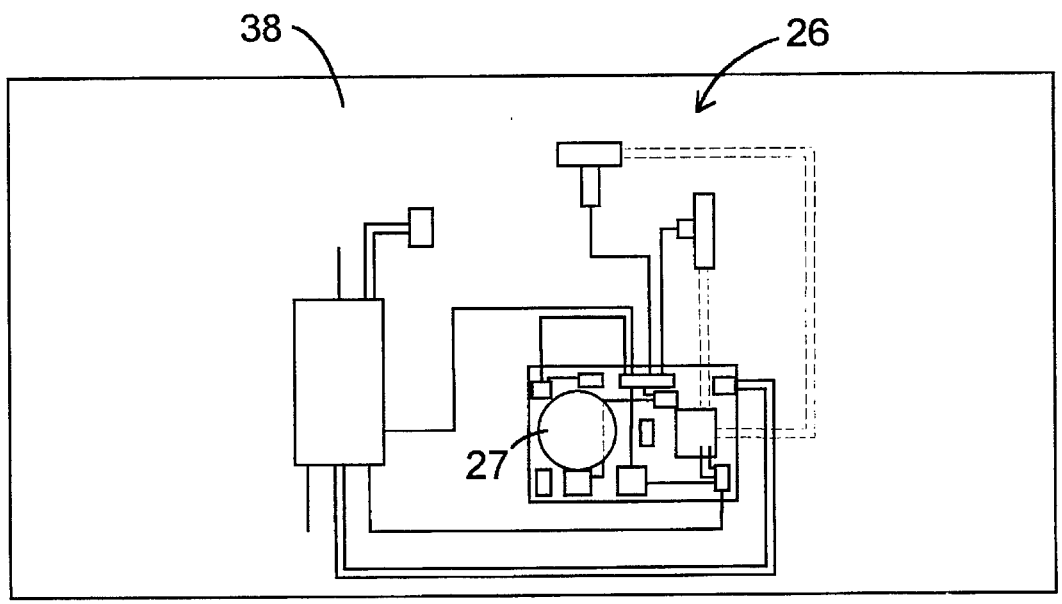
FIG. 8 is a perspective view of the UV Lamp.

As shown in FIGS. 8 and 9, the UV lamp 26 preferably used, is an electrodeless Area Exposure Lamp, preferably AEL1BN, manufactured by Fusion Imaging Systems of Rockville, MD. This UV lamp 26 was originally designed and used in imaging, contact printing and large-area ultraviolet exposure. This UV lamp 26 does not contain electrodes. As a result, there is little or no problem with electrode deterioration after 1500 hours of use, as is the case in exposure lamps having electrodes. The UV lamp used in the present invention lasts up to approximately 10,000 hours.

Another feature of the electrodeless UV lamp 26 used in the present invention is that the lamp does not have a significant warm-up time prior to use, as is the case in electrode UV lamps. Since there is very little warm-up time, the UV lamp 26 does not have to remain activated during the substrate application, spin, spray and substrate removal operations. The UV lamp reverts to a standby mode when it is not in use. The standby mode may be an important feature. It permits the movement of the holder 28 and the substrate 50 into the curing chamber 12 without exposing excess coating material collected in spray application dish 210 to UV light. This excess coating material, if exposed, would tend to cure and possibly create contamination of subsequent substrates from airborne particles of cured excess coating material. The standby mode further enhances lamp life, and conserves energy by reducing the amount of time that UV light is radiated, by confining radiation to the curing cycle periods.

As generally shown in FIG. 1, the major functions of the method of applying the protective coating are carried out when the substrate 50 is positioned in a holder 28 of the apparatus. The substrate 50 is stationarily positioned on the holder 28, and sprayed with a UV curable solution while being revolved about its vertical axis. The sprayed substrate 50 is then subjected to a curing process (typically an ultraviolet cure) during which time the monomer upon the substrate 50 surface polymerizes and hardens to form a mar resistant substrate 50 surface.

The apparatus performing the method of coating and curing the coating may be located in a fully-automated "clean room" or similar system.

A preferred feature of the apparatus of the invention is the construction and cooperation of its members to contain any excess monomer solution within the spray application dish. The dish is constructed so as to prevent solution spray from contacting other components of the resting chamber. More importantly, the dish structure prevents solution sprayed from entering the mounting base where the solution could affect the elevation device and other parts of the pneumatic/control circuitry. The inner periphery sidewall arrangement of the spray application dish allows for the collection of a majority of the excess solution. Also, the dish is easily removable so as to permit easy disposal of collected monomer solution.

Another preferred feature of the apparatus of the invention is the cooperation of its members so that the substrate with applied coating and the elevating member are the only components in the coating application chamber that move to the curing chamber. The spray application dish, sprayer and other coating application chamber components and surfaces remain behind. In particular, this feature is preferably achieved by the use of the elevating member alone to move the substrate to the curing chamber. Additionally, the construction of the curing chamber to essentially prevent escape of UV irradiation and the stand-by mode of operation of the UV light help achieve this feature.

If the components and surfaces of the coating application chamber inadvertently become covered with monomer solution and/or film during the spray cycle, the present invention provides the advantage that such solution or film is not converted into polymer by UV irradiation. In coating apparatus designs where the coating application chamber components and surfaces are moved to the curing chamber, such an inadvertent covering of film becomes converted to hard-to-remove polymer. The polymer build up eventually damages these components and renders them unusable. With this advantage of the present invention, however, repeated coating formation cycles are permitted without extensive clean-up or irreversible damage to the coating application chamber components by the build-up of undesirable polymer coating. Moreover, the inadvertent solution or film covering on these components can be easily removed while a polymer coating cannot.

Method of Curing

As generally depicted in FIG. 1, the substrate 50 is placed in a holder 28, having a stabilizer for stabilizing the substrate 50. After the substrate 50 has been stabilized, the holder 28 and substrate 50 thereon are revolved about a self contained vertical axis. While the holder 28 and substrate 50 are revolving, dispenser(s) 61 applies ultraviolet curable liquid solution of monomer, preferably a mar resistant monomer with a suitable UV photo initiator and solvent, to a surface of the substrate 50. The curable liquid solution of monomer may be applied in one film coating or, more preferably, in a pre-coat film followed by a "hard" film coat. In the more preferred application, the pre-coat film may contain a cleaning agent and/or a flow agent. Preferably, the pre-coat film does not include any polymerizable matter. This pre-coat film may first be allowed to dry before the "hard" coat film is applied.

The curable liquid solution is composed of a mixture of ethylenic unsaturated monomers such as acrylate monomers and other monomers curable by UV radiation, together with UV cure agents such as free radical initiators, low boiling organic solvents such as alcohols and/or ketones and flow agents such as fluorocarbons. Generally, the ratio of monomers to solvents may be about 1:19 to 1:1 by weight, preferably about 1:4 by weight, and the ratio of monomers to cure agents may be about 1:0.03 to 1:0.3 by weight.

The substrate 50, such as lenses, molds and the like, is revolved at approximately 600–1500 rpm during application of the ultraviolet curable liquid solution. This rpm allows the liquid solution to disperse radially, thereby forming an evenly spread coating film on the surface of the substrate 50. Revolution continues at 600–1500 rpm for a short period of time, long enough to allow any excess solvent to clear off.

The continued revolving of the substrate 50 during solvent evaporation may be important, due to the ovular shape of substrate 50. In some embodiments, approximately about the time when the coating film is at a density level that prevents it from flowing, rotational forces are ended. The ending of rotational forces does not cause an abrupt end to rotation of the holder 28 and substrate 50 thereon. Instead, rotation ends gradually by frictional forces. A complete end to holder 28 and substrate 50 rotation may occur well after the holder 28 and substrate 50 have entered the curing chamber 12.

After the rotational forces are ended, the holder 28 and substrate 50 thereon are elevated to the curing chamber 12, as shown in FIG. 1. Upon reaching the curing chamber 12, the coverings 64 close and UV light is radiated for curing the coating film on the lens through polymerization. UV light is radiated for a period of time necessary to achieve a desired level of polymerization (e.g., approximately 35–45 seconds). After the UV irradiation cycle, the UV light emitting apparatus 26 returns to standby mode, ending emission of UV light and triggering the curing chamber covering 64 to open. After the covering 64 opens, the holder 28 having a substrate 50 thereon is returned to the coating application chamber 14 by the apparatus, ending the curing process. The covering 64 subsequently closes and remains closed until the next curing cycle begins.

The apparatus and method of the invention have several advantages which overcome problems in the art.

One disadvantage of some prior art coaters is that after the optical element has had coating material applied to it, it must be manually transferred from a spinning apparatus to a curing apparatus. In the apparatus and method of the invention, this manual transfer process is eliminated, thus reducing the opportunity for human error while allowing for more automated coating processes.

Another disadvantage of prior art coaters is that if, as is in the case of U.S. Pat. No. 4,895,102 to Kachel et al., the spinning apparatus is moved under the UV source, then the excess coating material which has been spun off the optical element will tend to polymerize. This polymerized material tends to become airborne and cause contamination of subsequent elements. In addition, this polymerized material is difficult to clean from the components of the spin coating apparatus. Again, this problem is substantially reduced in the present invention because only the lens (or mold) and the lens holder is moved into the curing chamber, thus reducing the possibility that excess coating material (which is mostly present around the lens holder in the coating application chamber) will contact UV light and become polymerized and subsequently airborne. Of course, cleaning of apparatus of the invention is also easier since less excess coating material tends to become polymerized.

EXAMPLE

Figure 10:
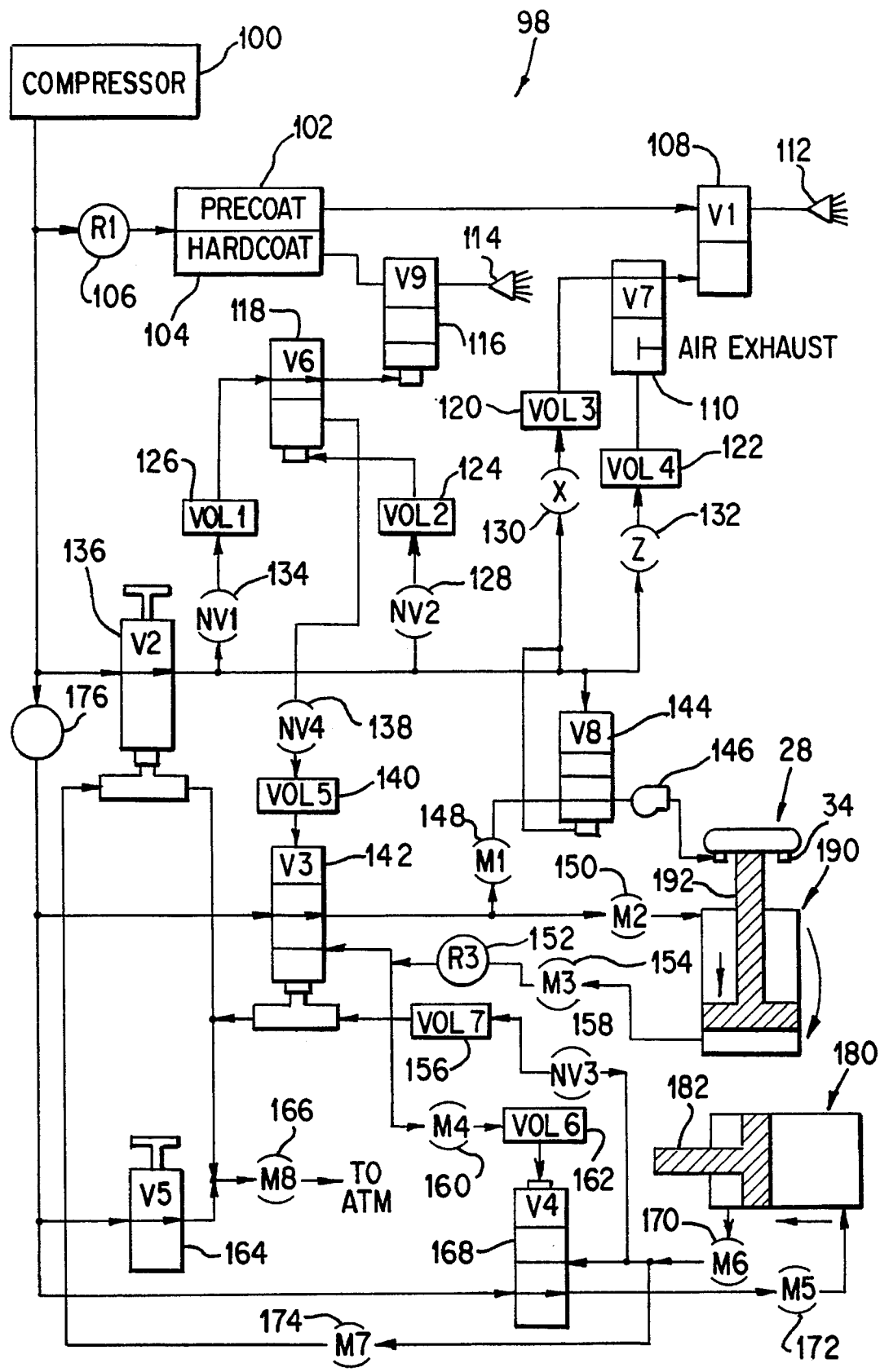
FIG. 10 is a circuit diagram of the pneumatic circuit.

Spin coating can be performed using an apparatus such as that shown in FIG. 1. FIG. 10 illustrates the inner workings of each element comprising the pneumatic circuit 98.

The spin coating machine of the present example, for applying mar resistant coatings to substrates such as ophthalmic lenses, molds and the like, is illustrated in FIG. 1. The apparatus is controlled by a pneumatic circuit 98, having 70–75 psi air as shown in FIG. 10. In order to operate the apparatus, air is compressed, brought into the system, and forced through a series of valves and volumes, which serve as time delays, as shown in FIG. 10. A substrate 50 is placed in the center of a silicone rubber sleeve 24 of the holder 28.

In one embodiment, the holder 28 may be comprised of a rubber sleeve 24, attached to the first surface 30 of a disk 22 having first 30 and second 32 surfaces.

Figure 13:
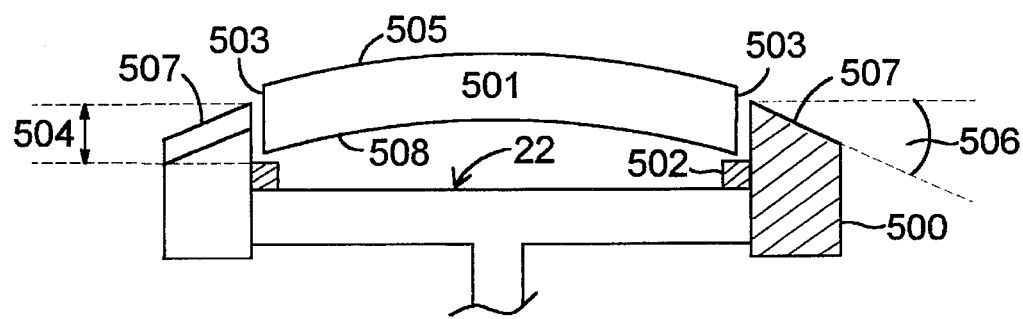
FIG. 13 is a diagram of a sleeve on which a mold or lens is placed while in a coating application chamber.

In an alternate embodiment, sleeve 24 as shown in FIG. 2 may be replaced with a sleeve 500 as shown in FIG. 13. Sleeve 500 helps to seal the concave side of the lens during the coating application, thus preventing coating material from contacting the concave surfaces, thereby preventing optical irregularities and/or tinting defects caused by the unwanted coating material curing on the concave surface of the lens.

A cross section of sleeve 500 is shown in FIG. 13 with a lens or mold 501 in place on ledge 502 of sleeve 500. Lens or mold 501 has an upper surface 505 and a lower surface 508. Generally, the height 504 should be less than the thickness 503 of the lens or mold edge. In this manner the top or convex surface 505 is always at a higher point than the highest point of sleeve 500, and excess coating material may then be slung from surface 505 without hitting sleeve 500. The sleeve 500 is preferably formed with a sloped surface 507, which allows excess coating material to drip off the outside of sleeve 500. Angle 506 is preferably 26 degrees. Ledge 502 is preferably about 3 mm in thickness and about 1.5 mm in height. Sleeve 500 may typically be made of silicone-based compounds, and may have a 73 mm inside diameter to properly hold a 74 mm substrate 501.

Figure 14:
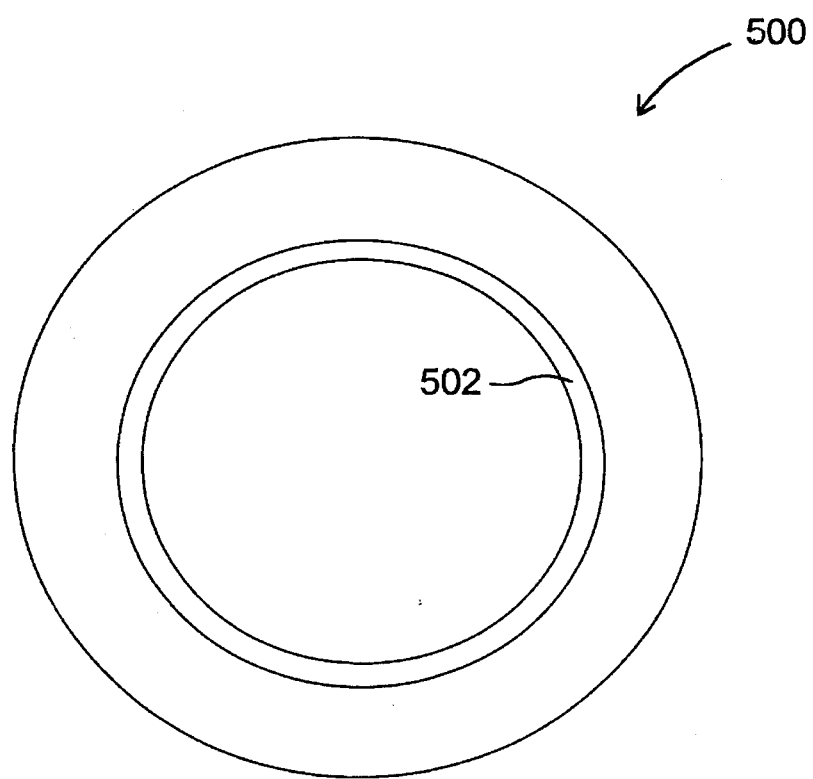
FIG. 14 is a top view of the sleeve shown in FIG. 13.

FIG. 14 is a top view of the sleeve 500 in FIG. 13.

While the system is not operational, and during the application of the curing liquid, the holder 28 may be positioned inside the spray application dish 210 circular cavity 204 such that the disk 22 first surface 30 remains above the spray application dish 210 inner periphery sidewall arrangement 208, shown in FIG. 2. Once the substrate 50 is placed in the holder 28, the compressor 100 may be activated to start a rotation means including air blowers (not shown), thus providing a jet stream of air that revolves the substrate 50 and holder 28 from 600 to 1500 rpm.

Figure 5:
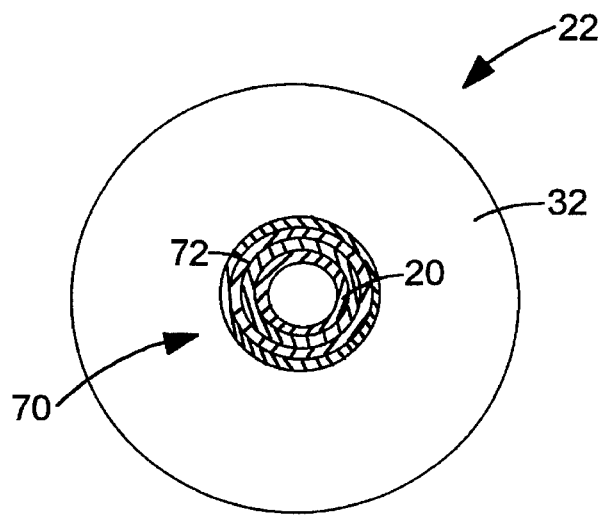
FIG. 5 is a perspective view of a surface of the holder disk illustrating the ball bearing system.

The rotator may be pneumatically controlled, and as shown in FIGS. 5 and 6 is comprised of a ball bearing system 70 on the second surface 32 of the disk 22, having a plurality of vanes 34 that engage with air from air blowers 146. The ball bearing system 70 comprises a circular cavity in the disk second surface 32 engaged with ball bearings 72 which interact with the shaft 20 first end 19, where the shaft 20 has first 19 and second 21 ends. The shaft 20 first end 19 is adapted to allow for its proper engagement with the ball bearings 72 and disk circular cavity. The ball bearing system 70 allows free rotational movement of the holder 28 and lens 70 positioned thereon. The ball bearing system 70 connected at the shaft 20 first end is preferred. It allows rotational movement of the holder 28 without rotational movement of the shaft 20 connected to the holder 28.

As illustrated in FIG. 6, the rotation of the holder 28 is caused by the interaction of air from the blowers 146 and the vanes 34 pointing vertically down into the mounting base on the disk 22 second surface 32. The blowers 146 are positioned such that air is blown in a direction and at an angle allowing for maximum rotational speed of the holder 28 when air is blown at the vanes 34.

While the substrate 50, illustrated in FIG. 1, is spinning in the holder 28, a mar resistant UV curable monomer with a suitable UV photo initiator and solvent are sprayed onto the substrate 50. There are usually two spray applications. The first is a pre-coat and the second is a hard coat. Once the two coats are sprayed onto the substrate 50 and the excess spray is spun off, the holder 28, which sits on an air activated piston/cylinder device 190 is lifted up into the UV curing chamber 12 as the piston/cylinder 190 is forced upward by the pneumatic system.

The shaft 20 may interact with the piston/cylinder 190, illustrated in FIG. 6, to elevate the substrate and holder. The shaft 20 second end is attached to the plunger axle 192 of the piston/cylinder 190. The piston/cylinder 190 may be controlled by the amount of air flowing in or out of the piston/cylinder 190. The plunger axle 192 movement, elevation or lowering, is determined by plunger response, rising or falling, to varying air pressure.

As shown in FIG. 1, once the holder 28 is in the UV curing chamber 12, the coverings 64 close, and the UV radiation cures the coating. After the cure cycle, the coverings 64 open, and the piston/cylinder 190 lowers the holder 28 to its original position, in the coating application chamber 14, where the coated substrate 50 is removed. The UV lamp 26 used to cure the lens coating is an electrodeless area exposure lens system, illustrated in FIGS. 8 and 9.

More specifically, as shown in FIG. 10, the pneumatic circuit 98 controlling this embodiment, shows that an air compressor 100 brings compressed air, 70 to 75 psi, into the pneumatic circuit having a series of valves and volumes that serve as time delays. Compressed air is supplied first to a standard compressor regulator, R1 106, a three way valve, V2 136, acting as a start button, and a pressure gauge 176. Once the start button, V2 136, has been activated, compressed air enters and begins operation of the pneumatic circuit. R1 106 assures that the air pressure entering tanks 102, 104, holding pre-coat, 102, and hard coat, 104, solutions that make up the mar resistant monomer, is reduced to 2½ psi.

The compressor regulator, 106, supplies pressure to the precoat tank, 102, causing an amount of solution to be deposited to a three way valve, V1 108, utilized in the pre-coater spraying mechanism. Pre-coat solution enters the top of the three way valve, V1 108, and exits under pressure through an appropriate spray nozzle 112, onto a substrate. The three way valve, V1 108, is controlled by a four way valve V7 110. V7 110 controls whether or not the pre-coat sprays, through air pressure control. The air pressure exerted by V7 110 is controlled by two in line volume chambers, 120 and 122, providing time delay. When cylinder 120 (vol. 3) is filled, the pre-coat begins spraying and when cylinder 122 (vol. 4) is filled, the pre-coat completes spraying. Flow control valves X 130 and Z 132 add further control to the pre-coat spray cycle, through interaction with time delays cylinder (vol. 3) 120 and (vol. 4) 122.

The air pressure exerted by R1 106 into hard coat tank 104, causes an amount of hard coat solution to be deposited to a four way valve, V9 116, utilized in the hard coat spraying mechanism. Hard coat solution enters the top of the four way valve, V9 116, and exits under pressure through an appropriate spray nozzle 114, onto a lens. V9 116 is controlled by a four way valve, V6 118, that controls whether or not the hard coat sprays from four way valve V9 116 through the attached spray nozzle 114, by controlling the air pressure supplied to V9 116. (Vol. 1,) a cylindrical inline miniature volume chamber 126, positioned between the main air line and V6, serves as a time delay. Cylinder (Vol. 2), also a cylindrical inline miniature volume chamber 124, positioned between the main air line and V6 118, serves as a time delay. Cylinder (Vol. 1) 126 determines the amount of time before V6 118 is enabled to supply air pressure to V9 116. Cylinder (Vol 2.) 124 determines the length of time V6 118 is enabled and supplying air pressure to V9 116, which is how long the hard coat is being sprayed. When cylinder (Vol 1.) 126 fills, V6 118 supplies air pressure. When cylinder (Vol. 2) 124 fills, V6 118 is disabled, ending the spray of hard coat. Cylinder (Vol. 1) 126 is further controlled by a needle valve, NV 1 134, that regulates air flowing through the system to cylinder (Vol. 1.) 126. Cylinder (Vol. 2) 124 is also further controlled by a needle valve, NV 2 128, that regulates air flowing through the system to cylinder (Vol. 2.) 124. Four way valve, V6 118, also allows air to bleed down to a four way valve, V3 142, that operates a rise piston/cylinder.

A three way valve, V8 144, controls the air supplied to blower 146 that supplies a jet stream of air that interacts with the vanes 34 of the holder 28, causing the holder 28 to spin (not shown). When cylindrical inline miniature volume chambers, (vol. 2) 124 and (vol. 5) 122, are filled, signaling the end of the spray cycle, the three way valve, V8 144, switches back to end supply of air to the blowers 46. A meter flow control valve, M1 148, adds further circuit control over three way valve, V8 144, by controlling the air flowing into valve V8 144.

A four way valve V3 142 is controlled by the exhaust from four way valve V6 118. Control is further enhanced by directing the V6 118 valve exhaust to flow from, four way valve, V6 118, through a cylindrical inline miniature volume chamber (vol. 5) 140, that provides time delay prior to the rising of piston/cylinder 190. The exhaust from four way valve V6 118 flowing through cylinder (vol. 5) 140 shuts off four way valve V6 118. As the exhaust continues to flow, it flows through cylinder (vol. 5) 140, and it shuts off four way valve, V3 142, so that the piston/cylinder 190 will rise. A needle valve NV4 138 provides further control over when the piston/cylinder 190 will rise through control of air flowing through cylinder (vol. 5) 140.

The piston/cylinder 190, is controlled by the four way valve V3 142. Meter flow control valves, M2 150, and M3 154, along with regulator R3 152 control the amount of air flow entering and exiting piston/cylinder 190. When valve V3 142 is deactivated, no air flows into piston/cylinder 190, and it stays down in a rested position. When the four way valve V3 142 is activated, it allows air to flow into piston/cylinder 190, piston/cylinder 190 rises moving the substrate holder 28 from the resting station 14 into the curing chamber 12, so that the substrate 50 sprayed with ultraviolet curing solution may be cured.

A meter flow control valve M8 regulates the air flowing through valve, V5, 164 acting as the stop/reset button when engaged. Three way valve, V5, 164 is naturally closed and when opened, it purges the air lines. A needle valve NV3 158, provides further pressure release for door piston/cylinder 180 circuit lines. Cylinder (Vol. 7) 156, a cylindrical inline miniature volume chamber delays the pressure release of the needle valve NV3 158 until reset time. Cylinder (vol. 7) 156 also helps restore the rise piston/cylinder 190 back to its down position.

Figure 12:
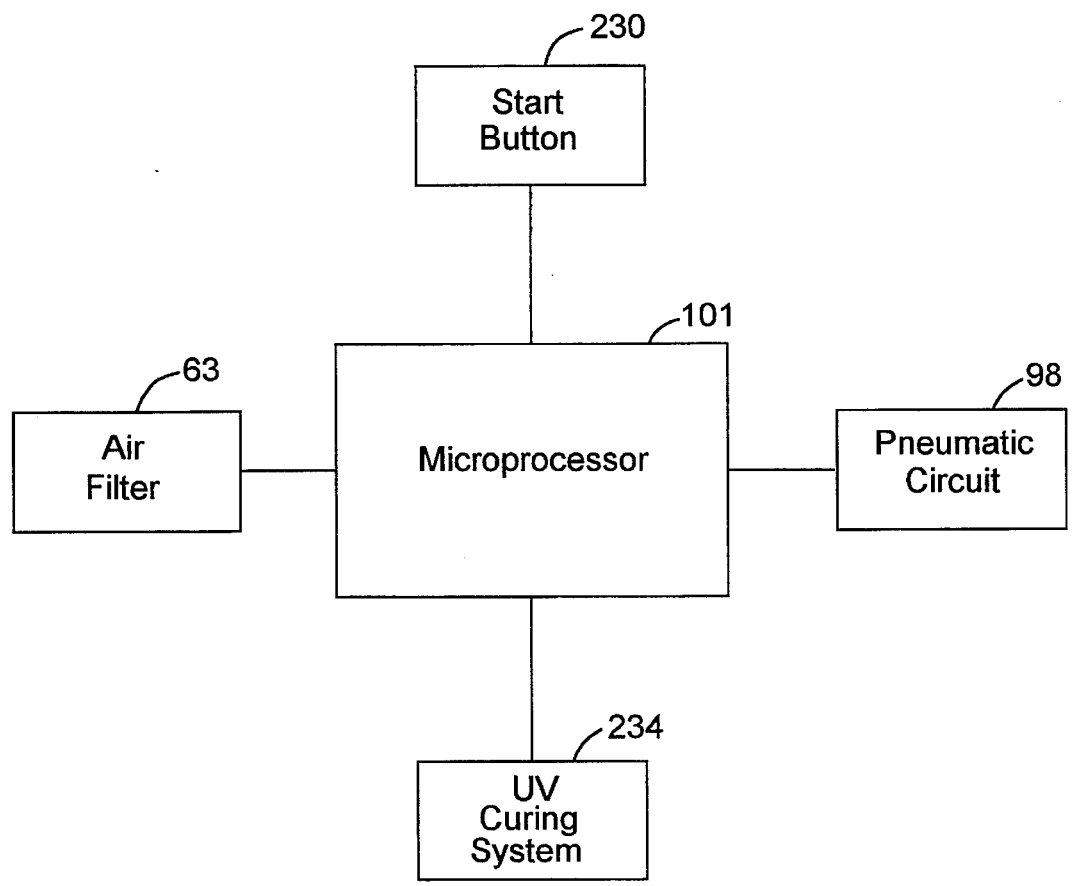
FIG. 12 is a block diagram showing an embodiment using a microprocessor substituted for the pneumatic circuit.

FIG. 11 illustrates a block diagram of the essential functional circuit elements. Substitution of the pneumatic circuit with electrical circuitry would consist mainly of replacing the volume cylinders acting as time delays, and the control valves with microprocessor 101 and the appropriate timers. As illustrated in FIG. 12, the microprocessor would control circuit operation. As seen in FIG. 11, the start 230 of curing method cycle, begins with the activation of the compressor 100. Further, the controller would determine the frequency and amount of liquid sprayed from the pre-coat 220 and hard coat 222 spray systems onto the hard substrates, the timing of the activation of the rise piston/cylinder system 226 that elevates the substrate holder system into the curing chamber, the door cylinder operation system 228, the UV curing system 234, and the systems stop/reset system 232. FIG. 11 also depicts a lens holder spin system 224.

It is envisioned that the apparatus and method of the invention may be used with a wide variety of lenses, molds, and scratch resistant compositions. For instance, glass molds may be used, and lenses made of glass, CR-39, or the compositions disclosed in U.S. patent application Ser. No. 07/931,946, entitled "APPARATUS AND PROCESS FOR LENS CURING AND COATING," which was filed Aug. 18, 1992, may also be used. This application is incorporated herein by reference.

It should be readily understood that the present invention is not limited to the exemplary embodiments as described above, but that many modification and changes may be made thereto without departing from the scope of the claims appended hereto. For example, the pneumatic circuit control 98 of the disclosed embodiment can be replaced by an electrical control system.

What is claimed is:

1. An apparatus for applying a coating on an eyeglass lens, comprising:

an eyeglass lens holder constructed to revolve during use;

a dispenser for applying a coating material to a lens positioned on the holder, the dispenser being located in a coating application chamber;

an elevation component connected to the holder, the elevation component being constructed to raise the holder from the coating application chamber to a curing chamber during use, and to lower the holder from the curing chamber to the coating application chamber during use; and wherein the curing chamber comprises an ultraviolet lamp constructed to direct ultraviolet light towards the coating material on the eyeglass lens during use, a bottom wall with an opening, and a covering for the opening that is constructed to be normally closed, to open to allow the holder to pass through the opening during use, and to close after the holder has passed through the opening during use.

2. The apparatus of claim 1, wherein the eyeglass lens is at least one of an ophthalmic lens and an optic material.

3. The apparatus of claim 1, wherein the eyeglass lens holder revolves about a vertical axis during use.

4. The apparatus of claim 1, wherein the dispenser applies a predetermined amount of coating material onto a lens during use.

5. The apparatus of claim 1, wherein the coating application chamber includes a spray application dish for collecting excess coating material during use.

6. The apparatus of claim 1, wherein the elevation component is constructed to operate automatically during use, the elevation component being signaled to operate by a first signal received after the coating material has been applied, and by a second signal received after the coating material has been cured.

7. The apparatus of claim 6, wherein the automatic operation functions by a pneumatic circuit.

8. The apparatus of claim 6, wherein automatic operation functions by an electrical circuit.

9. The apparatus of claim 1, wherein the revolving of the eyeglass lens holder causes the coating material to radially disperse during use, thereby forming a substantially even coating.

10. The apparatus of claim 1, wherein movement of the covering is automatically activated by a pneumatic circuit during use.

11. The apparatus of claim 1, wherein the curing chamber comprises an air distribution system for distributing filtered air throughout the curing chamber during use.

12. The apparatus of claim 1, wherein the ultraviolet lamp is electrodeless and emits ultraviolet light cyclically during use.

13. The apparatus of claim 1, wherein movement of the covering is automatically activated by an electrical circuit during use.

14. An apparatus for curing a coating on an eyeglass lens, comprising:

an eyeglass lens holder constructed to revolve during use;

a dispenser for applying ultraviolet curable coating material to the lens positioned on the holder, the dispenser being located in a coating application chamber;

an elevation component connected to the holder, the elevation component being constructed to raise the holder from the coating application chamber to a curing chamber during use, and to lower the holder from the curing chamber to the coating application chamber during use; and wherein the curing chamber comprises an ultraviolet lamp constructed to direct ultraviolet light towards the coating material on the eyeglass lens during use, a bottom wall with an opening, a covering for the opening that is constructed to be normally closed, to open to allow the holder to pass through the opening during use, and to close after the holder has passed through the opening during use, and an air distribution system for passing filtered air throughout the curing chamber during use.

15. The apparatus of claim 14, wherein the revolving of the eyeglass lens holder occurs about a vertical axis and causes the ultraviolet curable coating material to radially disperse, forming a substantially even coating on a surface of the eyeglass lens.

16. The apparatus of claim 14, wherein the elevation component operates automatically during use, and wherein the elevation component is signaled to operate by a first signal received after the ultraviolet curable coating material has been applied, and by a second signal received after the coating material has been cured.

17. The apparatus of claim 16 wherein automatic operation functions by a pneumatic circuit during use.

18. The apparatus of claim 16 wherein automatic operation functions by an electrical circuit during use.

19. The apparatus of claim 14, wherein the dispenser is constructed to apply ultraviolet curable coating material during use to the lens in a pre-coat step and a coat step.

20. The apparatus of claim 14, wherein the ultraviolet lamp is electrodeless and has a standby mode during which ultraviolet light is not emitted.

21. An apparatus for applying a coating on an eyeglass mold, comprising:

an eyeglass mold holder constructed to revolve during use;

a dispenser for applying a coating material to a mold positioned on the holder, the dispenser being located in a coating application chamber;

an elevation component connected to the holder, the elevation component constructed to raise the holder from the coating application chamber to a curing chamber during use, and to lower the holder from the curing chamber to the coating application chamber during use; and wherein the curing chamber comprises an ultraviolet lamp constructed to direct ultraviolet light towards the coating material on the eyeglass mold during use, a bottom wall with an opening, and a covering for the opening that is constructed to be normally closed, to open to allow the holder to pass through the opening during use, and to close after the holder has passed through the opening during use.

22. The apparatus of claim 21, wherein the eyeglass mold is at least one of a mold for an ophthalmic lens, and an optic material.

23. The apparatus of claim 21, wherein the eyeglass mold holder revolves about a vertical axis during use.

24. The apparatus of claim 21, wherein the dispenser applies a predetermined amount of coating material onto a mold during use.

25. The apparatus of claim 21, wherein the coating application chamber includes a spray application dish for collecting excess coating material during use.

26. The apparatus of claim 21, wherein the elevation component constructed to operate automatically during use, the elevation component being signaled to operate by a first signal received after the coating material has been applied, and by a second signal received after the coating material has been cured.

27. The apparatus of claim 26, wherein automatic operation functions by a pneumatic circuit.

28. The apparatus of claim 26, wherein automatic operation functions by an electrical circuit.

29. The apparatus of claim 21, wherein the revolving of the eyeglass mold holder causes the coating material to radially disperse during use, thereby forming a substantially even coating.

30. The apparatus of claim 21, wherein movement of the covering is automatically activated by a pneumatic circuit during use.

31. The apparatus of claim 21, wherein movement of the covering is automatically activated by an electrical circuit during use.

32. The apparatus of claim 21, wherein the curing chamber comprises an air distribution system for distributing filtered air throughout the curing, chamber during use.

33. The apparatus of claim 21, wherein the ultraviolet lamp is electrodeless and emits ultraviolet light cyclically during use.

34. An apparatus for curing a coating on an eyeglass mold, comprising:

an eyeglass mold holder constructed to revolve during use;

a dispenser for applying ultraviolet curable coating material to the mold positioned on the holder, the dispenser being located in a coating application chamber;

an elevation component connected to the holder, the elevation component constructed to raise the holder from the coating application chamber to a curing chamber during use, and to lower the holder from the curing chamber to the coating application chamber during use; and wherein the curing chamber comprises an ultraviolet lamp constructed to direct ultraviolet light towards the coating material on the eyeglass mold during use, a bottom wall with an opening, a covering for the opening that is constructed to be normally closed, to open to allow the holder to pass through the opening during use, and to close after the holder has passed through the opening during use, and an air distribution system for passing filtered air throughout the curing chamber during use.

35. The apparatus of claim 34, wherein the revolving of the eyeglass mold holder occurs about a vertical axis and causes the ultraviolet curable coating material to radially disperse, forming a substantially even coating on a surface of the eyeglass mold.

36. The apparatus of claim 34, wherein the elevation component operates automatically during use, and wherein the elevation component is signaled to operate by a first signal received after the ultraviolet curable coating material has been applied, and by a second signal received after the coating material has been cured.

37. The apparatus of claim 36, wherein automatic operation functions by a pneumatic circuit during use.

38. The apparatus of claim 36, wherein automatic operation functions by an electrical circuit during use.

39. The apparatus of claim 34, wherein the dispenser is constructed to apply ultraviolet curable coating material during use to the mold in a pre-coat step and a coat step.

40. The apparatus of claim 34, wherein the ultraviolet lamp is electrodeless and has a standby mode during which ultraviolet light is not emitted.

* * * * *

UNITED STATES PATENT AND TRADEMARK OFFICE
CERTIFICATE OF CORRECTION

PATENT NO. : 5,514,214

DATED : May 7, 1996

INVENTOR(S) : Joel et al.

It is certified that error appears in the above-indentified patent and that said Letters Patent is hereby corrected as shown below:

In the Claims:

Claim 1, col. 12, line 58, please delete "allow-the" and substitute therefor --allow the --.

Claim 26, col. 14, line 36, after component insert --is--.

Claim 32, col. 14, line 57, after curing delete ",".

Signed and Sealed this

Twentieth Day of August, 1996

Attest:

BRUCE LEHMAN

Attesting Officer

Commissioner of Patents and Trademarks